(12) United States Patent
Cahill et al.

(10) Patent No.: US 7,714,864 B2
(45) Date of Patent: May 11, 2010

(54) VISUAL RESOURCE PROFILER FOR GRAPHICAL APPLICATIONS

(75) Inventors: Tim Cahill, Monroe, WA (US); Jon Sheller, Cedar Rapids, IA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 11/600,607

(22) Filed: Nov. 16, 2006

(65) Prior Publication Data

US 2008/0120543 A1 May 22, 2008

(51) Int. Cl.
*G09G 5/00* (2006.01)
*G09G 5/02* (2006.01)
*G06T 11/20* (2006.01)
*G06F 11/00* (2006.01)
*G06F 17/00* (2006.01)
*G06F 3/048* (2006.01)
*G06F 9/44* (2006.01)

(52) U.S. Cl. .................... 345/440; 345/594; 345/440.2; 345/629; 345/419; 717/100; 717/105; 717/121; 717/131; 715/200; 715/700; 715/763; 715/783; 714/39; 714/37; 714/47

(58) Field of Classification Search .................. 717/100, 717/105, 109, 114, 120–121, 124–127, 131–133, 717/140–141, 154–157; 345/418–419, 594, 345/619, 629–630, 440, 440.2, 553, 557, 345/626, 581, 645; 715/200, 700, 713, 763, 715/764, 783; 714/37–39, 47
See application file for complete search history.

(56) References Cited

U.S. PATENT DOCUMENTS

| | | | |
|---|---|---|---|
| 6,189,142 B1 | 2/2001 | Johnston et al. | |
| 6,356,285 B1 * | 3/2002 | Burkwald et al. | 715/853 |
| 6,493,868 B1 | 12/2002 | DaSilva et al. | |
| 6,519,766 B1 | 2/2003 | Barritz et al. | |
| 6,728,949 B1 | 4/2004 | Bryant et al. | |
| 7,043,719 B2 | 5/2006 | Gotwals et al. | |
| 7,093,234 B2 | 8/2006 | Hibbeler et al. | |
| 2003/0058238 A1 * | 3/2003 | Doak et al. | 345/419 |
| 2003/0140280 A1 * | 7/2003 | Kaler et al. | 714/37 |
| 2003/0140282 A1 * | 7/2003 | Kaler et al. | 714/39 |
| 2005/0268173 A1 | 12/2005 | Kudukoli et al. | |
| 2005/0283765 A1 | 12/2005 | Warren et al. | |
| 2006/0075386 A1 | 4/2006 | Loh et al. | |
| 2006/0095895 A1 | 5/2006 | K. | |

(Continued)

OTHER PUBLICATIONS

"The Visual Profiler", http://aros.ca.sandia.gov/~cljanss/perf/vprof/index.html.

(Continued)

*Primary Examiner*—Wesner Sajous
(74) *Attorney, Agent, or Firm*—Capitol City TechLaw; Richard C. Irving

(57) ABSTRACT

A visual representation of performance data is displayed for a target application. The visual representation includes a visual indicator associated with a visual element of the target application. The visual indicator graphically illustrates a processing cost for the associated visual element with respect to other visual elements in the target application. The processing cost for the visual element includes a relative and/or absolute processing cost. The processing cost may be separated into different categories, such as animation, layout, rendering, and the like.

18 Claims, 8 Drawing Sheets

U.S. PATENT DOCUMENTS

| | | | |
|---|---|---|---|
| 2007/0073712 A1* | 3/2007 | Falk et al. | 707/10 |
| 2008/0120543 A1* | 5/2008 | Cahill et al. | 715/700 |
| 2008/0127106 A1* | 5/2008 | Ward | 717/127 |
| 2008/0127116 A1* | 5/2008 | Kosche et al. | 717/130 |
| 2008/0127120 A1* | 5/2008 | Kosche et al. | 717/131 |

OTHER PUBLICATIONS

Dunwoody et al., "Tracing Interactive 3D Graphics Programs", pp. 155-163, Date: 1990, http://delivery.acm.org/10.1145/100000/91439/p155-dunwoody.pdf?key1=91439&key2=2999196511&coll=GUIDE&dl=GUIDE&CEID=803154&CETOKEN=3.

* cited by examiner

VISUAL RESOURCE PROFILER FOR GRAPHICAL APPLICATIONS

BACKGROUND

A graphical application is built using many different and distinct visual elements. During development of the graphical application, the application may be analyzed to determine which elements consume a disproportionate amount of processing time. A tool that analyzes the performance of an application is commonly referred to as a performance profiler.

Traditional performance profilers provide a set of call graphs of function names to developers. The call graphs provide the total time spent in each function. Developers then perform a trial and error process to determine how best to modify the application so that it executes more efficiently. Thus, the current technique for profiling applications is not ideal.

An adequate performance profiler for graphical applications has eluded those skilled in the art, until now.

SUMMARY

Embodiments of the invention are directed at a visual resource profiler. Generally stated, embodiments of the invention display a visual representation of performance data for a target application. The visual representation includes a visual indicator associated with a visual element of the target application. The visual indicator may graphically illustrate both a relative processing cost (i.e., percentage of the total cost) and/or an absolute processing cost (e.g., CPU time in milliseconds) for the associated visual element with respect to other visual elements in the target application. The visual resource profiler may also further break down the processing cost for the visual element into several software subsystems/services that contribute to the processing cost, such as animation, layout, rendering, and the like.

BRIEF DESCRIPTION OF THE DRAWINGS

Many of the attendant advantages of the invention will become more readily appreciated as the same becomes better understood with reference to the following detailed description, when taken in conjunction with the accompanying drawings, briefly described here.

Embodiments of the invention will now be described in detail with reference to these Figures in which like numerals refer to like elements through-out.

DETAILED DESCRIPTION OF THE DRAWINGS

Various embodiments are described more fully below with reference to the accompanying drawings, which form a part hereof, and which show specific exemplary implementations for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation, or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Generally stated, the described embodiments include mechanisms and techniques for displaying performance data for a graphical application in a visual manner. For example, an element in a display may be colored using different shades of a specified color to indicate a relative performance cost for that element in relation to other elements within the graphical application. Based on the visual performance data, developers can then readily modify the graphical application to reduce unnecessary processing costs.

Illustrative Systems

The principles and concepts will first be described with reference to sample systems that may implement certain embodiments of the invention. These sample systems may be implemented using conventional or special purpose computing equipment programmed in accordance with the teachings of these embodiments.

Figure 1:
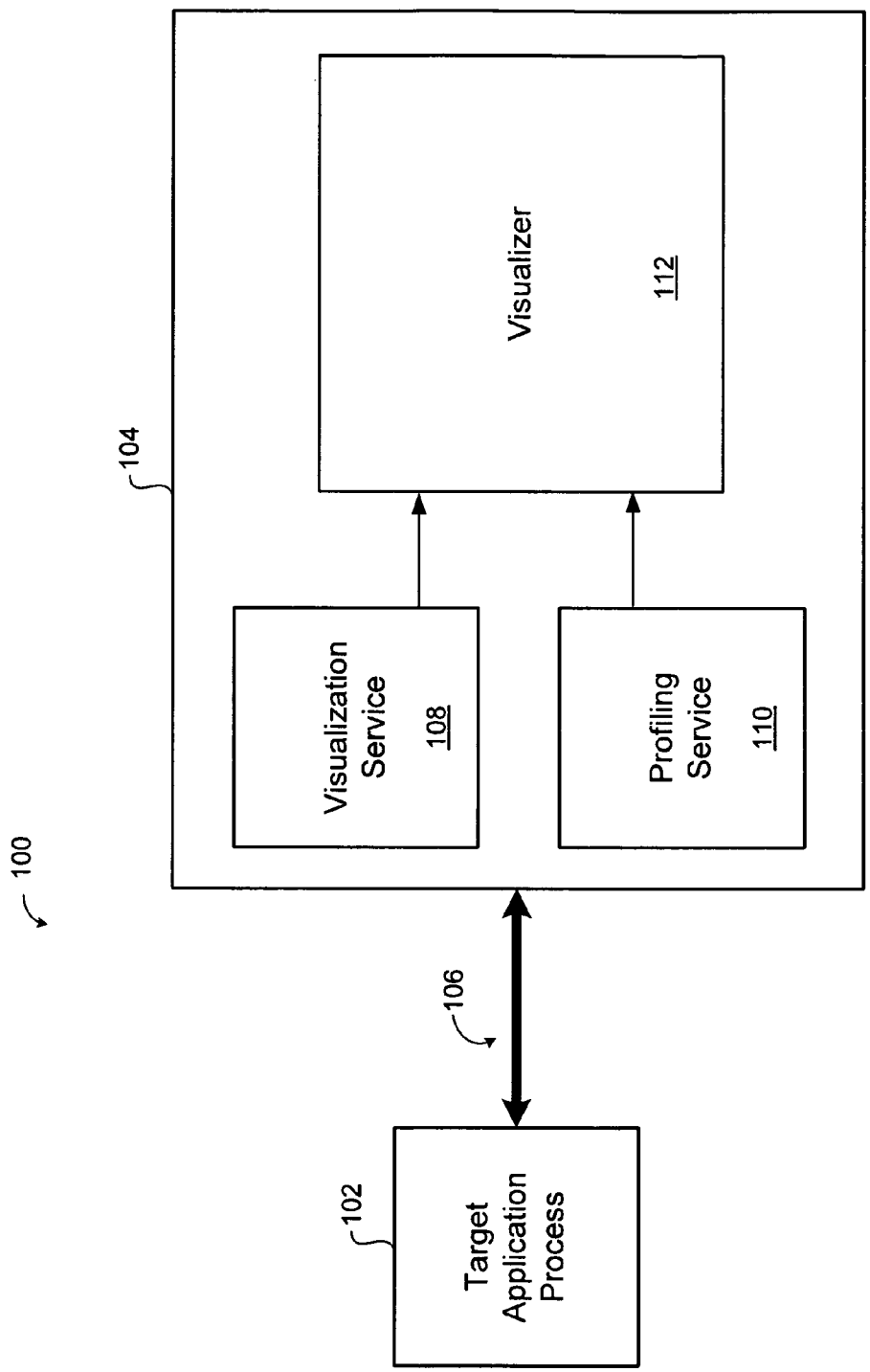
FIG. 1 is a functional block diagram generally illustrating a visual resource profiler system, in accordance with one embodiment of the invention.

FIG. 1 is a functional block diagram generally illustrating functional components of one simple system 100 for profiling a target application in accordance with one embodiment. The system 100 includes a target application process 102 and a visual profiler process 104. The target application process 102 is the application that is being developed and being analyzed for efficiency purposes. The target application process 102 and the visual profiler process 104 communicate via inter process communication 106, such as pipes, sockets, signals, semaphores, memory maps, shared memory, message queues, message passing, or the like. The system 100 may be implemented on one or more computing devices, such as that generally illustrated in FIG. 5 and described below.

The visual profiler process 104 includes a profiling service 110, a visualization service 108, and a visualizer 112. In overview, profiling service 110, described in detail in conjunction with FIG. 6 below, obtains performance data concerning the amount of time that is spent performing work for each visual element in the target application. The visualization service 108, described in detail in conjunction with FIG. 7, determines positional information for each visual element within a display generated by the target application. Visualizer 112, described in detail in conjunction with FIG. 8, uses the information obtained from the profiling service 110 and the visualization service 108 to create a visual representation of the performance data for the display generated by the target application. The visual representation may indicate the proportion of resources being used for various visual elements in the display and/or an absolute processing cost associated with each visual element.

Figure 2:
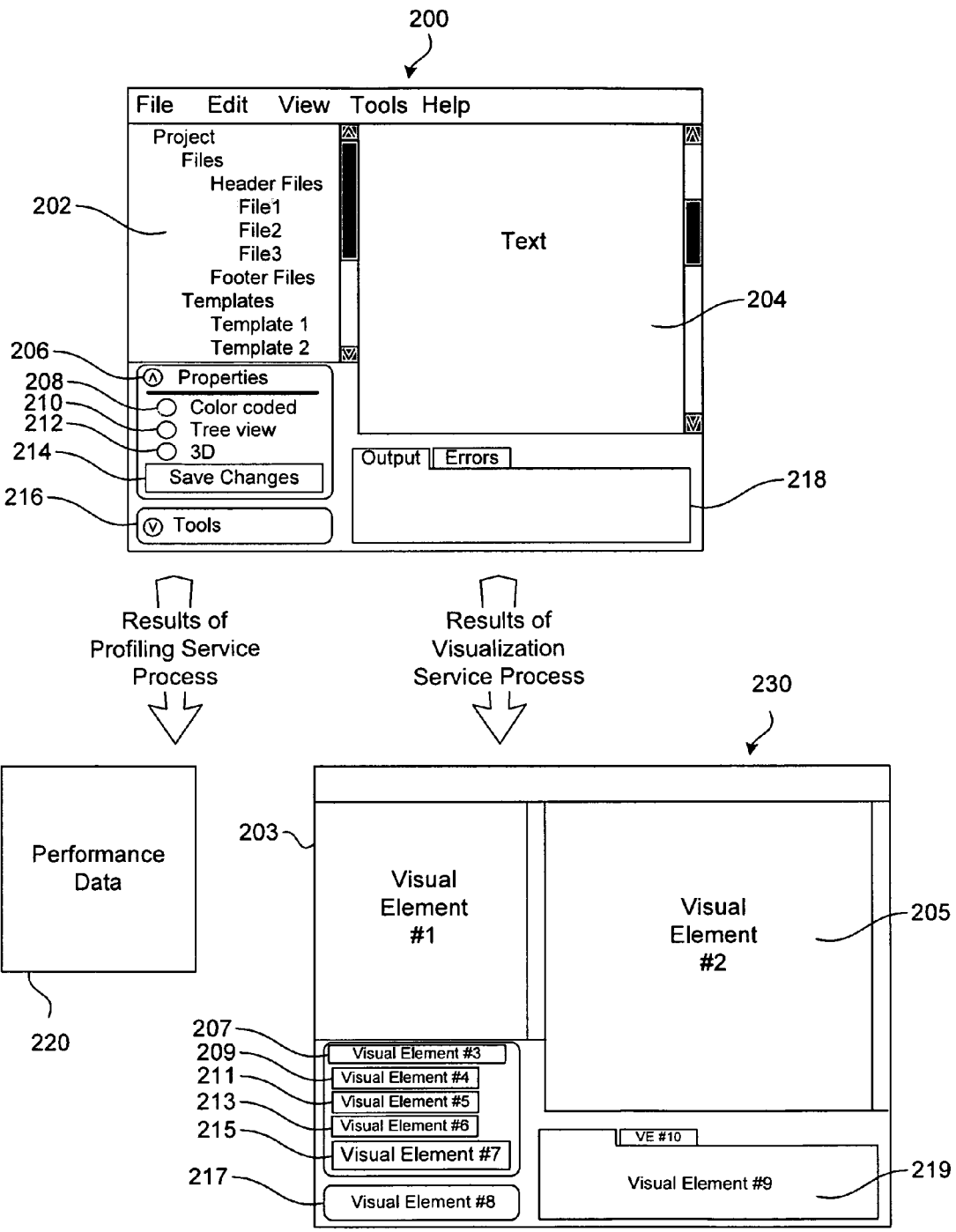
FIG. 2 depicts results produced by the profiling service and the visualization service shown in FIG. 1 for a display generated by a target application, in accordance with one embodiment of the invention.

FIG. 2 depicts results produced by the profiling service and the visualization service shown in FIG. 1 for a display 200 generated by a target application, in accordance with one embodiment of the invention. Display 200 may contain one or more visual elements. The visual elements support rendering features, such as transformations, clipping, and/or bounding box calculations. Display 200 includes several visual elements, such as textboxes 202 and 204, radio buttons 208, 210, and 212, button 214, and expandable labels 206 and 216. These and other types of visual elements may be generated by the target application.

During execution of the target application, the profiling service 110, shown in FIG. 1, collects performance data 220. The performance data 220 may be collected in various manners, such as a hash table or database. The visualization service creates visualization data 230 such as an element tree that contains a bounding box for each visual element, children of the visual element, and transforms performed between them. For convenience, FIG. 2 represents the visualization data 230 as a collection of bounding boxes (e.g., bounding boxes 203-219) associated with each of the visual elements 202-218 in display 200 of the target application. One will note that the bounding boxes are referenced using the next highest odd number with respect to their associated visual element in display 200. Each bounding box denotes a region within display 200 associated with a corresponding visual element.

Figure 3:
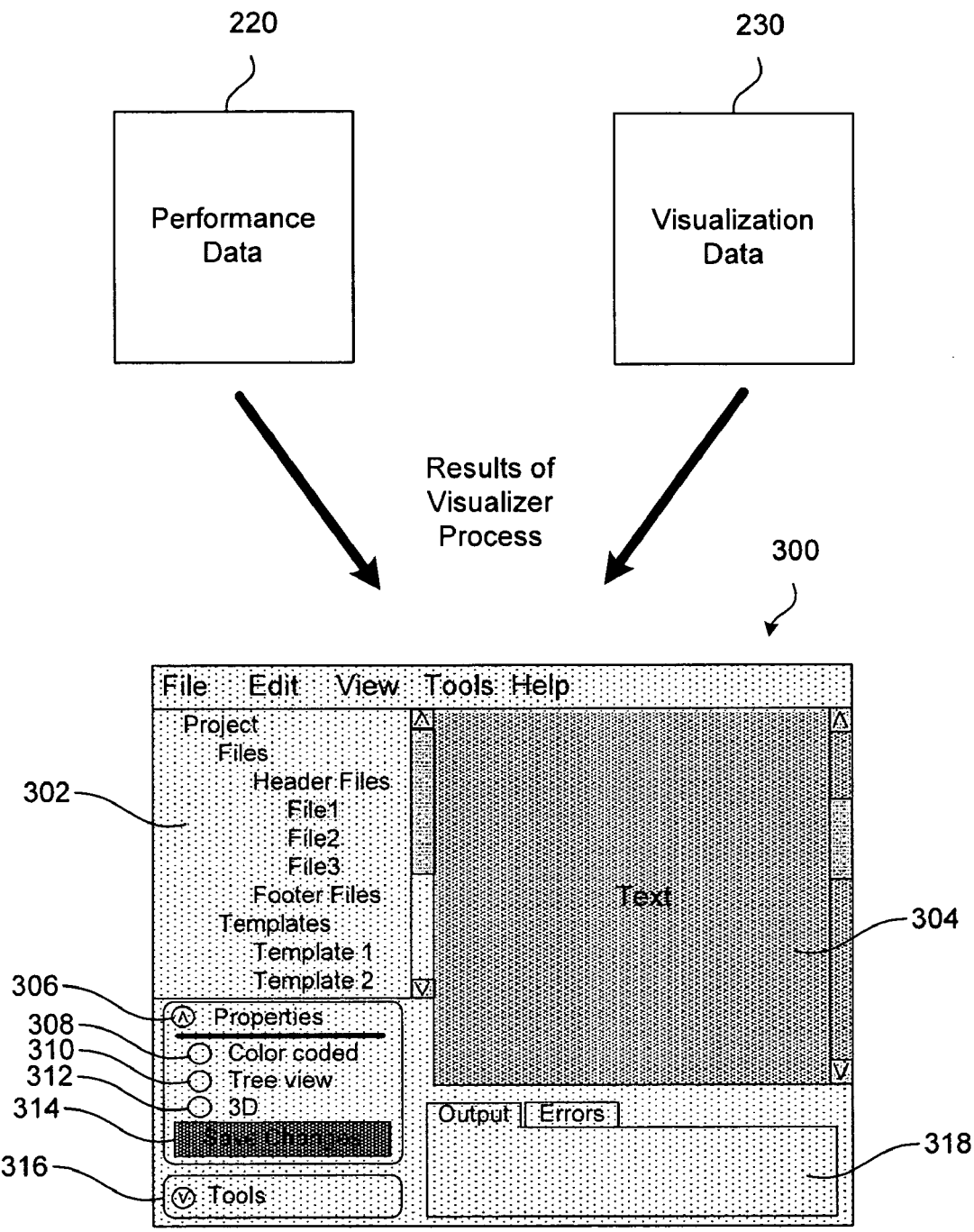
FIG. 3 depicts a visual representation of performance data generated by the visualizer shown in FIG. 1 for the display shown in FIG. 1 using the performance data and visualization data generated by the profiling service and the visualization service, in accordance with one embodiment of the invention.

FIG. 3 depicts a visual representation 300 of performance data generated by the visualizer shown in FIG. 1 for the display shown in FIG. 1 using the performance data 220 and visualization data 230 generated by the profiling service and visualization service, respectively, in accordance with one embodiment of the invention. As mentioned above, the visualizer process accepts the performance data 220 and the visualization data 230 and may use that data to determine a relative and/or absolute processing time for the visual elements in the display. The visualizer then displays a visual indicator for each visual element using the bounding box calculated for the visual element. The visual indicator may be color-coded in a manner such that a darker shade of a color may represent that a larger amount of processing time/resources were used in comparison with a visual element having a lighter shade of the color. The visual indicator may take various forms, such as a three dimensional bar graph, a scatter plot, or the like.

Visual representation 300 depicts relative percentages of processing costs using various densities of dots. For example, most of the visual elements are illustrated having a dot pattern that is sparsely populated. However, visual element 304 (i.e., the text button) is illustrated with a more populated dot pattern. This graphically indicates that visual element 304 and visual elements 302, 308-312, 316, and 318 have different relative processing costs, but visual elements 302, 308-312, 316, and 318 have similar relative processing costs. Visual element 314 (i.e., a save button) is shaded with an even denser dot pattern which represents that visual element 314 consumes more time and resources than the other visual elements (e.g., visual elements 302-312, 318, and 318) in the display. For illustrative purposes, the dot pattern was used to indicate the relative processing costs between visual elements. The dot pattern may represent a color scheme having various hues of a color to indicate the relative processing costs. In another embodiment, the dot patterns may represent a depth for a three-dimensional bar graph that indicates the amount of processing consumed by the corresponding visual element. For this embodiment, visual element 314 may have a taller three-dimensional bar to indicate that it consumes more processing that the other visual elements.

Figure 4:
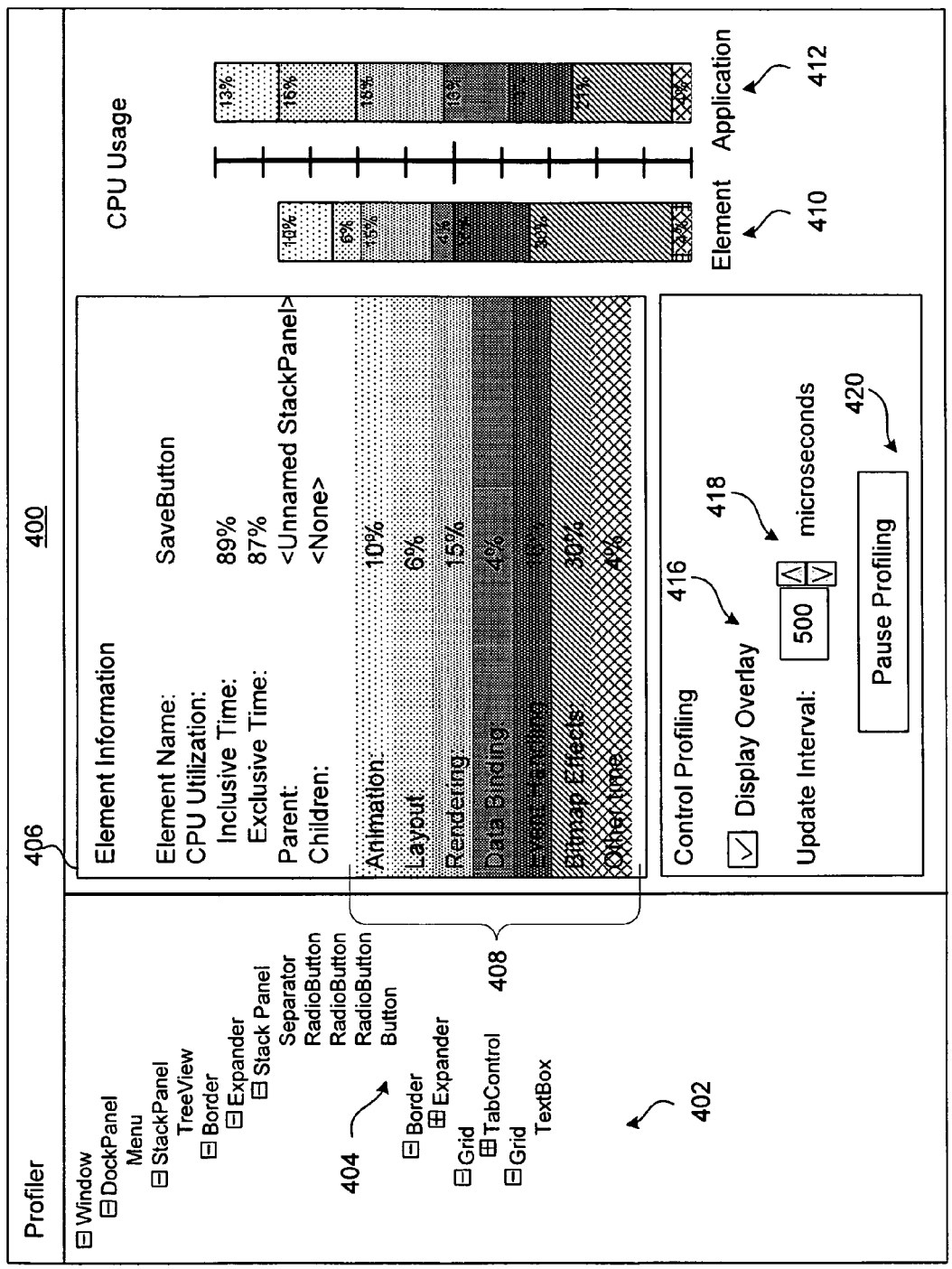
FIG. 4 is an illustrative user-interface for a visual resource profiler, in accordance with one embodiment of the invention.

FIG. 4 is an illustrative user-interface 400 for a visual resource profiler, in accordance with one embodiment of the invention. The user-interface 400 includes a tree-view 402 of the visual elements in a display generated by the target application. For convenience, tree-view 402 corresponds to the visual elements 202-218 illustrated in the example display 200 shown in FIG. 2. One of the visual elements (e.g., visual element 404) may be selected (shown with shaded background). Information 406 about the selected element may then be displayed. The information 406 may include an element name, inclusive time for CPU utilization, exclusive time for CPU utilization, a parent, and any children. Inclusive time refers to the processing time of an element and the processing time of its visual children. Exclusive time refers to the processing time of only the element itself. In addition, information 406 may include a list 408 of services and a corresponding percentage time that the element utilized the service. The list of services may include animation, layout, rendering, data binding, event handling, bitmap effects, or any other software service using CPU processing time or other resources on behalf of the visual element. The list of services may also include an 'other' or 'miscellaneous' category which illustrates processing time not attributable to a specific software subsystem or service.

In addition, user-interface 400 may represent each of the services as a bar on an element bar graph 410 using the same color-coding. An application bar graph 412 may be provided to illustrate the proportional use of the services for all of the profiled elements in the application. One will note that specific elements and/or software subsystems/services may be excluded from profiling if desired. When this occurs, the processing time allocated to the excluded elements and/or software subsystems/services may be omitted when calculating the percentages shown in the application bar graph 412.

User-interface 400 may also include a mechanism for controlling the profiler. For example, a checkbox 416 may be provided to specify whether the visual representation is displayed as an overlay over the display. An update interval box may be provided to specify how often to update the display. A button 420 may also be provided to turn profiling on or off.

As one can see, by having the performance data shown graphically along with the display being tested, as shown in FIG. 3, developers can easily see which visual element is consuming the most amount of time and resources. The developer may then select that visual element in the user-interface 400 to get a break-down of the services utilized by the visual element. Thus, in contrast with prior performance profilers that required detailed analysis of call graphs, the present visual performance profiler minimizes the amount of analysis needed to determine which element is consuming an undesirable amount of the processing time and to determine which service is causing most of the undesirable amount of processing time for that visual element. In the embodiment in which a three-dimensional bar graph is overlaid upon the visual element itself, the developer is able to ascertain which element and which service is contributing to the undesirable amount of processing time without using an additional display.

Figure 5:
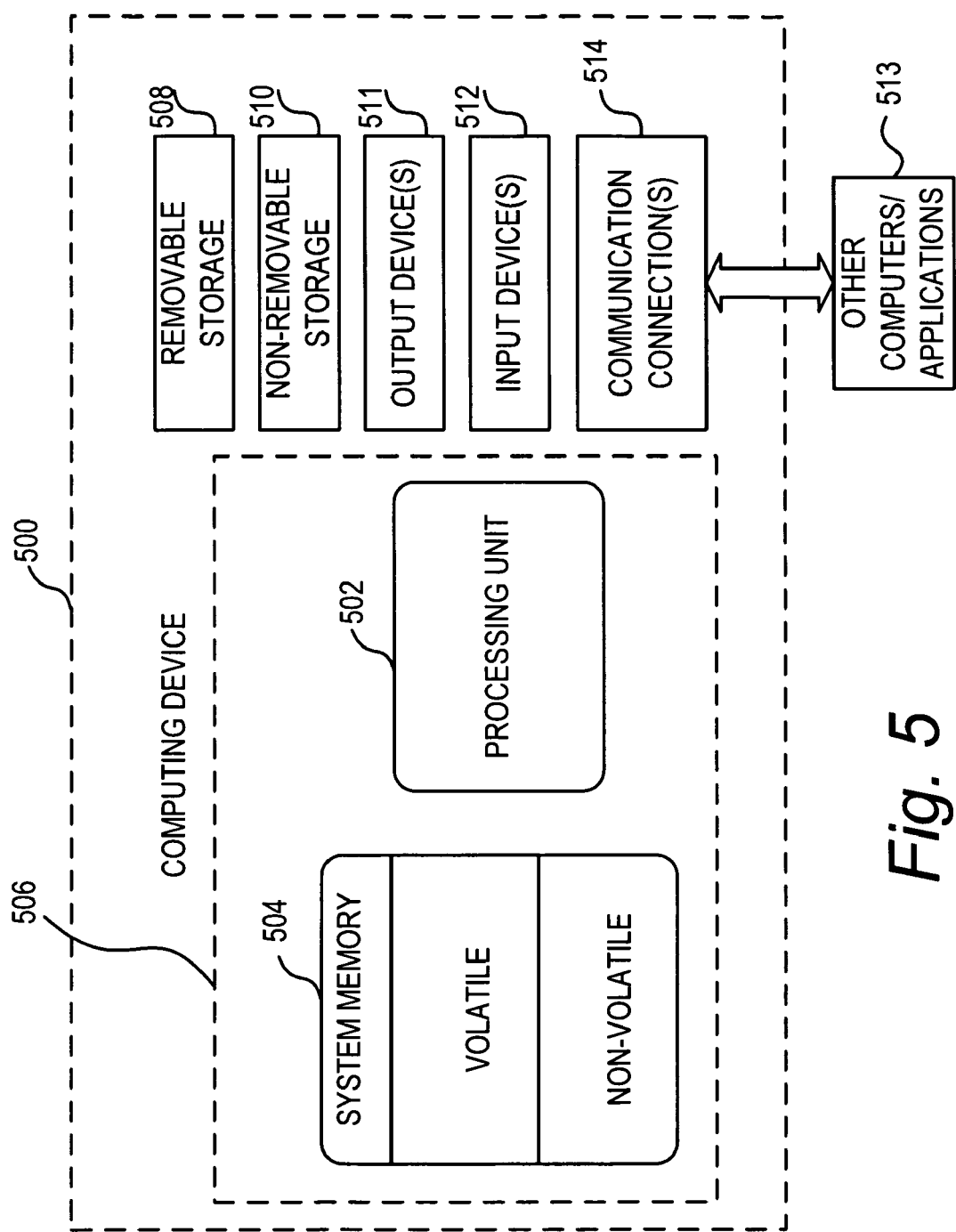
FIG. 5 is a functional block diagram of an exemplary computing device that may be used to implement one or more embodiments of the invention.

FIG. 5 is a functional block diagram of an exemplary computing device 500 that may be used to implement one or more embodiments of the invention. The computing device 500, in one basic configuration, includes at least a processing unit 502 and memory 504. Depending on the exact configuration and type of computing device, memory 504 may be volatile (such as RAM), non-volatile (such as ROM, flash memory, etc.) or some combination of the two. This basic configuration is illustrated in FIG. 5 by dashed line 506.

Additionally, device 500 may also have other features and functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with one or more computers and/or applications 513. Device 500 may also have input device(s) 512 such as keyboard, mouse, pen, voice input device, touch input device, etc. Output device(s) 511 such as a monitor, speakers, printer, PDA, mobile phone, and other types of digital display devices may also be included. These devices are well known in the art and need not be discussed at length here.

Illustrative Processes

Figure 6:
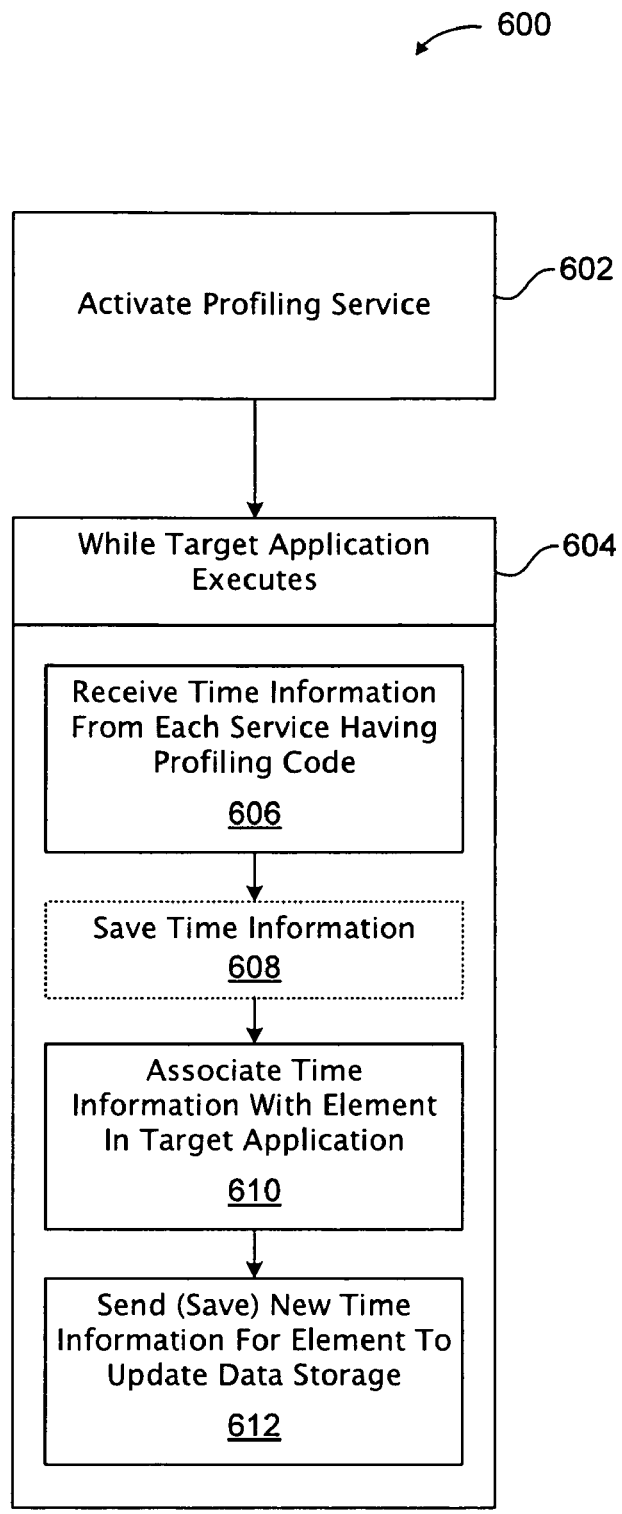
FIG. 6 is an operational flow diagram generally illustrating a process for obtaining performance data for a target application.
Figure 7:
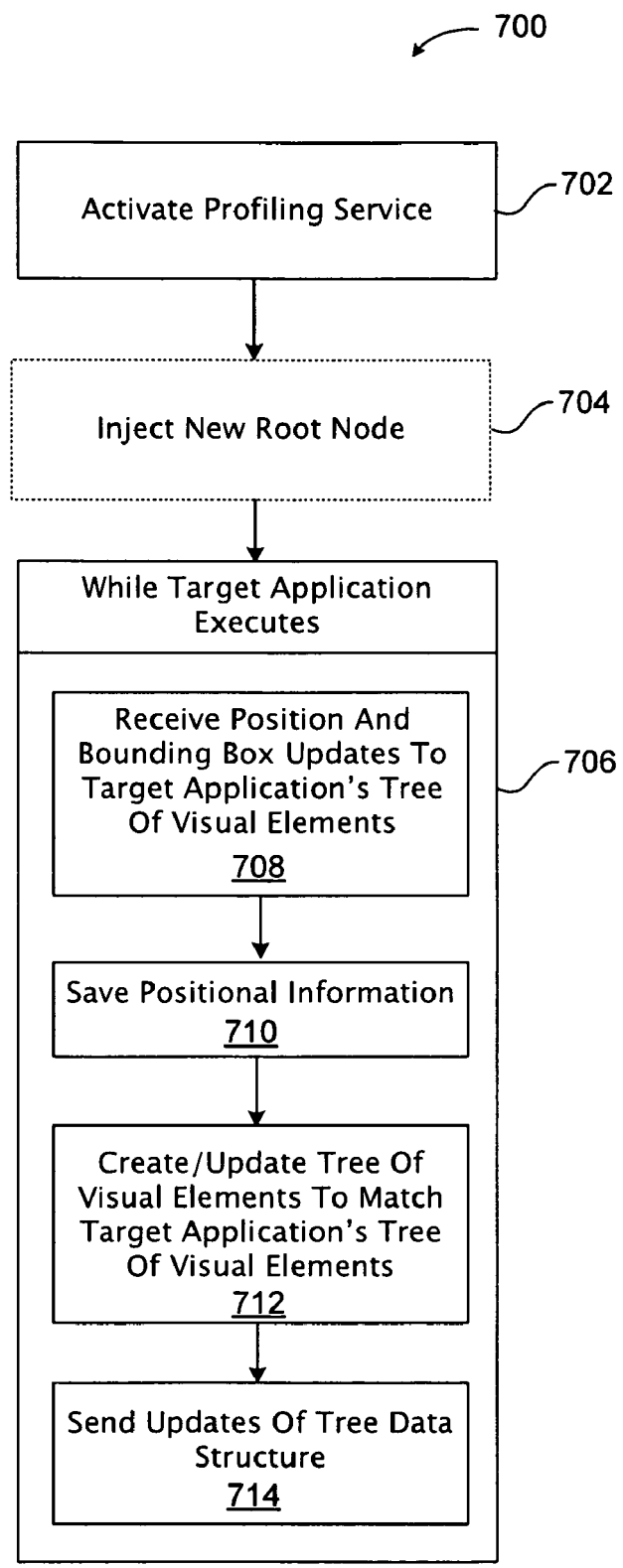
FIG. 7 is an operational flow diagram generally illustrating a process for obtaining positional information regarding visual elements within a target application.
Figure 8:
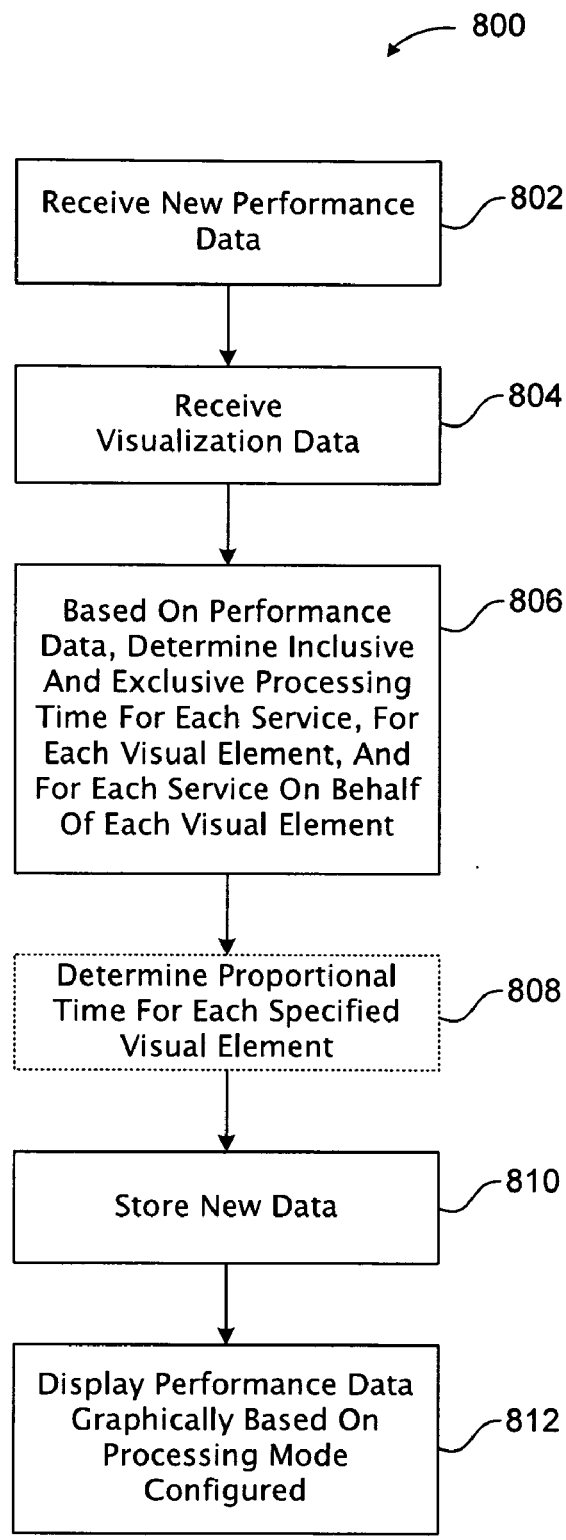
FIG. 8 is an operational flow diagram generally illustrating a process for creating a visual representation of the performance data for a target application, in accordance with one embodiment of the invention.

The principles and concepts will now be described with reference to sample processes that may be implemented by a computing device in certain embodiments of the invention. FIGS. 6-8 illustrate operational flow diagrams for sample processes. The processes may be implemented using computer-executable instructions in software or firmware, but may also be implemented in other ways, such as with programmable logic, electronic circuitry, or the like. In some alternative embodiments, certain of the operations may even be performed with limited human intervention. Moreover, the process is not to be interpreted as exclusive of other embodiments, but rather is provided as illustrative only.

FIG. 6 is an operational flow diagram generally illustrating a process for obtaining performance data for a target application. At block 602, the profiling service is activated. As shown in one exemplary embodiment for a user-interface in FIG. 4, this may be achieved by selecting a button which activates the profiling service. Alternatively, profiling may be enabled/disabled via a command line interface or via other mechanisms.

At block 604, while the target application executes, profiling process performs blocks 606-612. One will note that before target application executes, each service that the developer desires to include in process 600 has profiling code associated with the service. Some services may have profiling code already implemented within them. Other services may have profiling code injected within them in a manner known to those skilled in the art. The profiling code may utilize begin and end markers for interpreting specific function call sequences. This enables the profiler to identify the amount of resources spent in a higher-level service for which the function was called.

At block 606, whenever one of the services that have profiling code executes, the profiling code measures the processing time spent and posts that data to the profiling service for reception. The data may be in a form of an event which identifies a start time, an end time, and a category identifier. The start time and end time are associated with the begin and end markers, respectively. The category identifier identifies a service or subsystem associated with the event. If the event is generated for a specific visual element, the event may include an element identifier for the visual element. Occasionally, a circumstance may occur where one service invokes another service before exiting. For example, a layout service may invoke a rendering service before the layout service is finished. This causes the begin and end time for the rendering service to be completely encompassed within the begin and end time for the layout service. For this scenario, the rendering service is considered to be a child event to the layout service. Thus, the time associated with the rendering service is subtracted from the layout service when determining the time for that specific layout service event. The time calculated for a specific event, after any existing child events have been subtracted, are sent in events a from the target application to the profiler. They are then aggregated to determine the total time spent in the last N seconds. For example, if the profiler is configured to report time in the last ten seconds and 10 ms were sent in an event one second ago, 8.5 ms were sent in an event 2.5 seconds ago, and 20 ms were sent in an event 9 seconds ago, the profiler sums these individual times to determine a total time spent within an element over the last 10 seconds as 38.5 ms.

At block 608, the raw time information data may be optionally saved. As will be discussed below in FIG. 8, this allows the visual profiler to graphically display performance data of played back data.

At block 610, the time information that is received is associated with one of the visual elements in the target application. Each visual element in the target application is given a unique integer identifier (ID). As will be described below, because the same ID is passed to both the profiling service and visualization service, the services can associate profiling data with the proper visual element. The time information may be correlated to the visual element based on an element identifier for the visual element.

At block 612, the new time information associated with one of the visual elements is updated, which then may trigger updates in the graphical display of the profiling data. The profiling process continues until the target application exits, until the profiler is de-activated, or until an error occurs which causes the application to stop processing.

FIG. 7 is an operational flow diagram generally illustrating a process 700 for obtaining and maintaining positional information regarding visual elements within a target application. Process 700 begins once the profiling service is activated block 702 and continues until the target application exits block 704.

At optional block 704, a new root node may be injected into the tree of elements. By adding the new root node, three-dimensional transformations of the target application may be performed. It also allows the three-dimensional camera and view port to be changed. As will be described below, when the visualizer process is performed in the same process as the visualization service, changes in the profiling service causes a new visualization to be rendered on top of the current scene. This occurs because elements are included in a dirty region due to the visualization change. While this embodiment may work, the accuracy of the performance characteristics for the target application are severely altered. As will be explained below, in order to avoid this problem, an overlay of the visual representation may be copied onto the original scene using a copy mechanism. By positioning the copy outside the target scene's bounding rectangle, the target scene is not affected by the visualization. However, the scene is still rendered twice.

At block 706, visualization process performs blocks 708-714. At block 708, position and bounding box updates to a target application's visual tree are received. As one skilled in the art appreciates, a visual tree contains the visual elements used in a target application's user interface. The visual elements contain persisted drawing information. Therefore, the visual tree may be thought of as a scene graph that contains all the rendering information needed to compose the output to a display device. The visual tree contains the visual elements created by any means, such as by code, markup, template expansion, and the like. The rendering order for the visual elements is based on the visual element's position within the hierarchy of the visual tree. Typically, the order of traversal starts with a root visual, which is the top-most node in the visual tree. The root visual's children are then traversed, left to right. If a visual element has children, its children are traversed before the visual element's siblings. Thus, content of a child's visual elements is typically rendered in front of the visual element's own content.

At block 710, the positional data (e.g., position and bounding box) may optionally be saved as raw data. By saving at this point, the visualization service and profiling service may be agnostic to whether or not the data is real-time data or played back data. Playback is particularly useful for in-process visualizations such as three-dimensional representations of the performance data, since the high performance impact of the in-process visualization can be delayed to a later time. The visualization data and the performance data may also be recorded with a time-stamp alongside a terminal-service recorder. This would allow the target application's graphical interface to be played back along with the visualization data and performance data, making it possible to know what the target application was doing at the time the profiling data was recorded. During playback, the time stamped positional information and the time-stamped performance data may be consumed by the visualization and profiling services without knowing that the data was previously recorded.

At block 712, a tree of visual elements is created and updated based on the visual tree information that is received. The tree of visual elements matches the target application's tree of visual elements and contains a bounding box, transformation, element type, and identifier for the each visual element in the tree.

At block 714, changes to the tree of elements are updated. This may occur by sending the changes to the visualizer process' display.

FIG. 8 is an operational flow diagram generally illustrating a process for creating a visual representation of the performance data for a target application, in accordance with one embodiment of the invention. One will note that the blocks 802-812 in FIG. 8 need not be processed sequentially, but rather depict the type of processing performed by the visualizer 112 shown in FIG. 1. For example, blocks 802 and 804 are performed whenever updates occur from the profiling service and visualization service, respectively. Block 806 may be performed when new time information is received. In addition, one will note that the visualization process 800 may exist in-process, out-of-process, or in a process for playing back performance data and positional information.

At block 802, new time information is received. In one embodiment, new time information (i.e., performance data) may be received in real-time. In an alternate embodiment, the time information may be time-stamped data that was recorded earlier. The new time information may be piped from the profiling process via an inter-process communication channel.

At block 804, visualization data is received. Again, the visualization data may be received in real-time or may be time-stamped data that was recorded earlier.

At block 806, an inclusive time and an exclusive time are determined based on the new time information. As mentioned above, the inclusive time is based on the processing time for an element including its children and the exclusive time is processing time for the specific element only.

At block 808, a time is determined for each visual element. The time may be a proportional time (i.e., percentage) and/or an absolute time. The time may be further broken down into different services which were employed when performing processing for a corresponding visual element. The proportional time reflects the proportional time the different services performed processing in support of the target application as a whole, as illustrated by the application bar graph in FIG. 4. The absolute time reflects the processing time for each particular visual element.

At block 810, the new time information and/or new visualization data is stored. The information may be stored in a hash table, a database, or the like. Each visual element in the target application is associated with a unique identifier. The unique identifier is then used to correlate the time information and visualization data for each visual element. This allows the profiler to associate profiling data with the proper visual element.

At block 812, performance data is graphically displayed based on the processing mode configured for the visualizer process. The performance data may illustrate absolute processing costs and/or relative processing costs for each visual element. In addition, both inclusive and exclusive processing times may be graphically displayed. As mentioned above, the visualizer process may be in-process, out-of-process, or playback. When the visualizer process is configured as in-process, another visual node may be inserted near the top of the visual tree. When changes occur in the profiling service, a new visual representation is rendered on top of the current scene for the target application. This implementation, however, requires the target scene to be re-rendered when updates are received by the visualizer process.

An alternative in-process configuration may overlay the visual representation on a copy of the original scene using a copy mechanism. If the copy is positioned outside the target scene's bounding box, the target scene would not be affected by the visual representation overlay. However, the scene would need to be rendered twice.

When the visualizer process is configured as an out-of-process, the visualizer process is in a separate process. The performance data and positional data are then provided to this separate process via an inter-process communication. The separate process then positions the semi-transparent visual representation on top of the display generated by the target process.

When the visualizer process is configured for playback, the visualizer process obtains the performance data and positional data from recorded data. By using the time-stamp on the recorded data, the processing for the visualizer process is the same as if the data is received in real-time.

One will note that the length of time that performance data is kept may be configurable. When the time passes, the visualizer may avoid displaying expired data if it exists.

The advantages of the invention are many. For example, by having the performance data shown graphically along with the display being tested, as shown in FIG. 3, developers can easily see which visual element is consuming the most amount of CPU time and resources. The developer may then select that visual element in the user-interface 400 to get a break-down of the services utilized by the visual element. Thus, in contrast with prior performance profilers, the present visual performance profiler minimizes the amount of analysis needed to determine which element is consuming an undesirable amount of the processing time and to determine which service is causing most of the undesirable amount of processing time for that visual element. In the embodiment in which a three-dimensional bar graph is overlaid upon the visual element itself, the developer is able to ascertain which element and which service is contributing to the undesirable amount of processing time without trial and error and without an additional display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-readable medium having computer-executable instructions for a processing device to perform a method for profiling a target application, the method comprising:
   obtaining performance data for services used when executing the target application;
   determining an element tree for a display generated by the target application during execution of the target application; and
   displaying a visual representation of the performance data based on information in the element tree, the visual representation depicting a processing cost for each of a plurality of visual elements in the display generated by the target application, wherein
   the processing cost for one of the plurality of visual elements is divided among a plurality of services which are called to support the one of the plurality of visual elements.

2. The computer-readable medium recited in claim 1, wherein the processing cost comprises an absolute processing cost for each of the plurality of visual elements.

3. The computer-readable medium recited in claim 1, wherein the processing cost comprises a relative processing cost for each of the plurality of visual elements in relation to others of the plurality of visual elements.

4. The computer-readable medium recited in claim 1, wherein the processing cost includes an inclusive time that relates to a processing time associated with one of the plurality of visual elements and any visual children of the one of the plurality of visual elements and an exclusive time that relates to the processing time for the one of the plurality of visual elements without including the processing time associated with any of the visual children of the one of the plurality of visual elements.

5. The computer-readable medium recited in claim 1, wherein the visual representation of the performance data includes an overlay displayed on top of the display.

6. The computer-readable medium recited in claim 5, wherein the overlay includes respective regions associated with each of the plurality of visual elements, each of the respective regions having a semi-transparent color being displayed that indicates a relative processing time for an associated one of the plurality of visual elements in comparison with others of the plurality of visual elements.

7. The computer-readable medium recited in claim 6, wherein the color includes varying shades of a same color hue.

8. The computer-readable medium recited in claim 5, wherein the overlay includes a three-dimensional bar graph displayed on top of the plurality of visual elements in the display, a height of the three-dimensional bar graph indicating a relative processing time for an associated one of the plurality of visual elements in comparison with others of the plurality of visual elements.

9. The computer-readable medium recited in claim 8, wherein the three-dimensional bar graph for the associated one of the plurality of visual elements graphically illustrates a breakdown of a processing time for various services employed by the associated one of the plurality of visual elements.

10. A computer-readable medium encoded with computer-executable instructions for a processing device to perform a method for profiling a target application, the method comprising:
    creating a visual representation of performance data obtained from profiling code executed in support of a target application; and
    displaying the visual representation in conjunction with a display generated by the target application during execution of the target application, the visual representation including respective visual indicators graphically indicating a performance associated with each of a plurality of visual elements in the display generated by the target application during the execution of the target application, wherein:
    each of the respective visual indicators graphically illustrates a relative processing cost for the associated one of the plurality of visual elements in comparison to others of the plurality of visual elements, and
    the relative processing cost is illustrated by a color associated with each of the respective visual indicators.

11. The computer-readable medium recited in claim 10, wherein the visual representation is displayed on top of the display generated by the target application during the execution of the target application.

12. The computer-readable medium recited in claim 10, wherein the respective visual indicators comprise a three-dimensional bar graph.

13. A system configured to provide profiling information for a target application, the system comprising:
    a processor; and
    a memory into which a plurality of instructions are loaded, the plurality of instructions comprising:
       a profiling service configured to receive performance data generated by profiling code, the performance data associating a processing time for visual elements displayed by the target application;
       a visualization service configured to maintain an element tree based on a visual tree that includes the visual elements displayed by the target application, the element tree providing drawing information associated with each of the visual elements in the visual tree; and a visualizer configured to accept the performance data and the element tree, the visualizer being further configured to graphically display the performance data in conjunction with the display generated by the target application, wherein:

the visualizer graphically displays the performance data based on a respective bounding box of each of the associated visual elements, the visualizer further graphically displays the performance data using a color-coding scheme that indicates a relative processing time among the visual elements, the visual elements are associated with the bounding boxes, and the bounding boxes are included in the element tree.

14. The system recited in claim 13, wherein the profiling service further categorizes the processing time for one of the visual elements into a plurality of services which were employed by the one of the visual elements to perform processing associated with the one of the visual elements during execution of the target application.

15. The system recited in claim 13, wherein the processing time includes an absolute processing time and a relative processing time.

16. The computer-readable medium of claim 1, wherein:
the element tree includes a plurality of bounding boxes, and
each respective one of the plurality of bounding boxes is associated with each of the plurality of visual elements.

17. The computer-readable medium of claim 10, wherein:
the visual representation of the performance data includes an overlay displayed on top of the display, and
the overlay includes respective regions associated with each of the plurality of visual elements, each of the respective regions having a semi-transparent color that indicates the relative processing cost for an associated one of the plurality of visual elements in comparison to others of the plurality of visual elements.

18. The system recited in claim 13, wherein the visualizer is further configured to graphically display the performance data on top of the display generated by the target application.

* * * * *